US008192327B2

(12) United States Patent
Gibson et al.

(10) Patent No.: US 8,192,327 B2
(45) Date of Patent: Jun. 5, 2012

(54) METHODS AND SYSTEMS FOR ASSISTED DIRECT START CONTROL

(75) Inventors: Alex O'Connor Gibson, Ann Arbor, MI (US); Ross Dykstra Pursifull, Dearborn, MI (US); Gopichandra Surnilla, West Bloomfield, MI (US); Joseph Norman Ulrey, Dearborn, MI (US); Roger Lyle Huffmaster, Canton, MI (US); Peter John Grutter, Plymouth, MI (US); Yuji Fujii, Ann Arbor, MI (US); Gregory Michael Pietron, Canton, MI (US); Seung-Hoon Lee, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 89 days.

(21) Appl. No.: 12/707,570

(22) Filed: Feb. 17, 2010

(65) Prior Publication Data
US 2011/0136620 A1 Jun. 9, 2011

(51) Int. Cl.
*B60W 10/00* (2006.01)
(52) U.S. Cl. .......................................... 477/77
(58) Field of Classification Search .................. None
See application file for complete search history.

(56) References Cited

U.S. PATENT DOCUMENTS

| | | |
|---|---|---|
| 4,007,590 A | 2/1977 | Nagai et al. |
| 4,539,643 A | 9/1985 | Suzuki et al. |
| 6,190,284 B1 | 2/2001 | Kuroda et al. |
| 6,257,207 B1 | 7/2001 | Inui et al. |
| 6,334,834 B1 | 1/2002 | Mizutani et al. |
| 6,344,834 B1 | 2/2002 | Josypenko |
| 6,478,007 B2 | 11/2002 | Miyashita et al. |
| 6,615,785 B2 | 9/2003 | Weiss |
| 6,634,166 B2 | 10/2003 | Miyashita |
| 6,910,457 B2 | 6/2005 | Grieser et al. |
| 6,951,525 B2 | 10/2005 | Ries-Mueller |
| 7,243,011 B2 | 7/2007 | Koenig et al. |
| 7,287,500 B2 | 10/2007 | Izumi et al. |
| 7,316,631 B2 | 1/2008 | Tsunekawa |
| 7,329,206 B2 | 2/2008 | Tanaka |
| 7,683,503 B2 | 3/2010 | Yamaguchi |

(Continued)

FOREIGN PATENT DOCUMENTS

EP    1 069 346 A2    1/2001

(Continued)

OTHER PUBLICATIONS

Gibson. Alex O'Connor, "Method for Starting an Engine", U.S. Appl. No. 12/707,567, filed Feb. 17, 2010, FGT093071U02, 38 pages.

(Continued)

*Primary Examiner* — David D Le
*Assistant Examiner* — Erin D Bishop
(74) *Attorney, Agent, or Firm* — Allan J. Lippa; Alleman Hall McCoy Russell & Tuttle LLP

(57) ABSTRACT

Methods and systems are provided for controlling a vehicle engine coupled to a stepped-gear-ratio transmission. One example method comprises, in response to a first vehicle moving condition, shutting down the engine and at least partially disengaging the transmission while the vehicle is moving; and during a subsequent restart, while the vehicle is moving, starting the engine using starter motor assistance and adjusting a degree of engagement of a transmission clutch to adjust a torque transmitted to a wheel of the vehicle.

13 Claims, 4 Drawing Sheets

U.S. PATENT DOCUMENTS

| | | |
|---|---|---|
| 2004/0058779 A1* | 3/2004 | Ayabe .......................... 477/121 |
| 2005/0133006 A1 | 6/2005 | Frenz et al. |
| 2008/0228383 A1 | 9/2008 | Nakagawa et al. |
| 2011/0053735 A1 | 3/2011 | Lewis et al. |
| 2011/0054765 A1 | 3/2011 | Lewis et al. |

FOREIGN PATENT DOCUMENTS

| | | |
|---|---|---|
| EP | 1 344 673 A2 | 9/2003 |
| EP | 1591658 A2 | 11/2005 |
| EP | 1659285 A2 | 5/2006 |

OTHER PUBLICATIONS

Gibson. Alex O'Connor, "Method for Starting an Engine", U.S. Appl. No. 12/707,564, filed Feb. 17, 2010, FGT093071U01, 38 pages.

* cited by examiner

METHODS AND SYSTEMS FOR ASSISTED DIRECT START CONTROL

FIELD

The present application relates to methods and systems for controlling an engine shut-down and a subsequent restart.

BACKGROUND AND SUMMARY

Vehicle engines may be configured to shut-off during idle conditions when the vehicle comes to a stop while a brake is applied and restarted once the brake is released (e.g., a stop/start system). Such stop/start systems enable fuel savings, reduction in exhaust emissions, reduction in noise, and the like. Fuel consumption may be further reduced by shutting down the engine before braking, for example, during extended coasting periods.

One example approach to shut-down and subsequently restart the engine while the vehicle is traveling is disclosed by Ries-Muller in U.S. Pat. No. 6,951,525. Therein, when the vehicle is moving with the operator foot off the accelerator and the brake pedal not applied (that is, the vehicle is coasting), the engine is shut-down and the transmission clutches are disengaged to interrupt the engine braking torque. During a subsequent restart, the engine is restarted prior to a transition from free-wheel mode to engaged clutch travel mode by employing the fuel injection system using a charge regulator and/or an electric motor. After the engine is restarted, the reference describes using a combination of a braking intervention and a clutch intervention to maintain a vehicle braking torque during the transition, and thereby reduce undesirable vehicle deceleration when the vehicle speed is below a threshold.

However, in this approach, when the vehicle is restarted while the vehicle is still moving, the combination of the wheel torque from the moving vehicle and the engine torque from the spinning engine may lead to a torque surge and the vehicle may lurch forward when a clutch is suddenly engaged. As such, this may degrade the quality of the restart.

Thus in one example, some of the above issues may be addressed by a method for controlling a vehicle engine, the engine being coupled to a stepped gear ratio transmission. In one embodiment, the method comprises, in response to a first vehicle moving condition, shutting down the engine and at least partially disengaging the transmission while the vehicle is moving; and during a subsequent restart, while the vehicle is moving, starting the engine using starter motor assistance and adjusting a degree of engagement of a transmission clutch to adjust a torque transmitted to a wheel of the vehicle. The method may further comprise, in response to a second vehicle moving condition, not shutting down the engine.

In one example, the first vehicle moving condition may include a coasting condition wherein the vehicle is moving and the vehicle operator has not depressed the accelerator pedal or the brake pedal, and the vehicle speed is above a threshold. In response to the coasting condition, the engine may be shutdown, for example, by shutting off a fuel supply to the engine. Then, the vehicle transmission may be at least partially disengaged. In one example, the transmission may be fully disengaged. In another example, the transmission may be partially disengaged and a transmission clutch may be slipped controllably. For example, a smaller amount of clutch slippage may be provided, the amount adjusted responsive to the vehicle speed and/or engine speed at the time of engine shutdown.

During a subsequent restart, while the vehicle is still moving, and with the transmission clutch still engaged, the engine may be started by activating a starter motor, and a degree of engagement of the transmission clutch may be adjusted, for example by engaging the clutch and controllably slipping the clutch, to adjust a torque transmitted to the wheel. For example, a larger amount of clutch slippage may be provided, the amount adjusted responsive to the vehicle speed and/or engine speed at the time of engine restart.

In this way, an engine may be restarted with starter motor assistance while the vehicle is still moving, and without transmitting the engine torque to the wheels. By reducing the amount of engine torque transferred to the wheels and added to the wheel torque, a smoother transition between engine combusting and non-combusting modes may be achieved. Further, potential vehicle lurches from a sudden clutch engagement may also be reduced. As such, this may substantially improve the quality of engine restarts. Similarly, by reducing the amount of wheel torque that is transmitted from the wheels of a coasting vehicle to the engine following engine shutdown, a faster engine spin-down may be achieved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
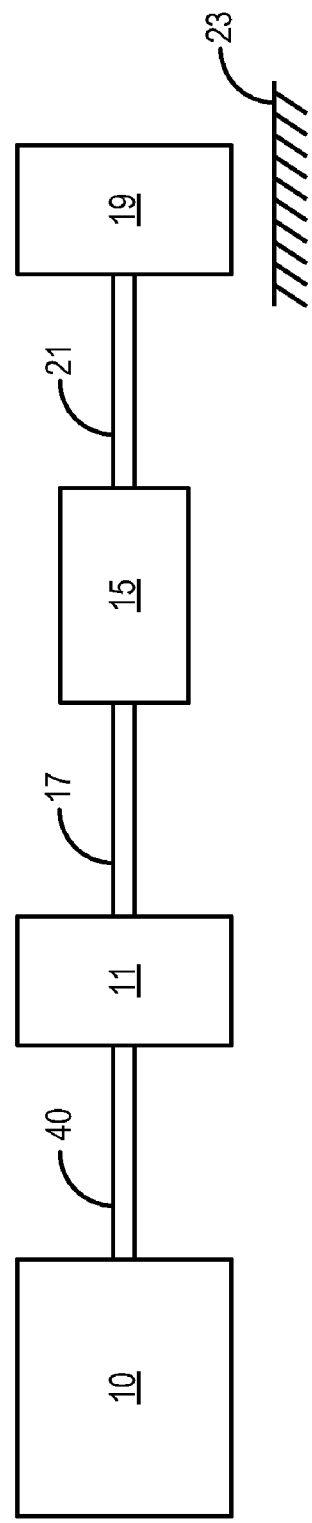
FIG. 1 shows a block diagram of a vehicle illustrating various power-train components.

The following description relates to a method for controlling an internal combustion engine coupled to a stepped gear ratio transmission in a motor vehicle, such as in the vehicle system of FIG. 1. During vehicle coasting conditions (for example, when the accelerator pedal is not pressed, and the brakes are not applied), an engine may be turned off and allowed to spin-down to rest while the vehicle is traveling. As described herein, in some embodiments, the transmission may be disengaged (for example, partially disengaged) and the clutches may be slipped while the engine is shut down to reduce the wheel torque applied on the engine by the moving wheels. The transmission may then be maintained in gear until and during a subsequent restart request. During the restart, while the engine is cranked with a starter and while the vehicle is still traveling, the engagement of the transmission may be adjusted using a controlled slip of a transmission clutch. For example, an amount of clutch slippage may be increased at restart until the engine speed reaches a threshold, following which the amount of clutch slippage may be reduced. An engine controller may be configured to perform a control routine, such as the routine of FIG. 3, to adjust an amount of clutch slippage and an engagement state of the transmission clutch(es), during engine shut-down and restart operations, responsive at to at least an engine speed and/or vehicle speed during vehicle coasting. Example adjustments are graphically depicted in FIG. 4. In this way, during an engine restart, clutch engagement may be rapidly and smoothly performed, thereby improving the quality of vehicle restarts. By extending the duration of engine shutdown to conditions of vehicle coasting, additional fuel economy benefits may be achieved.

Figure 2:
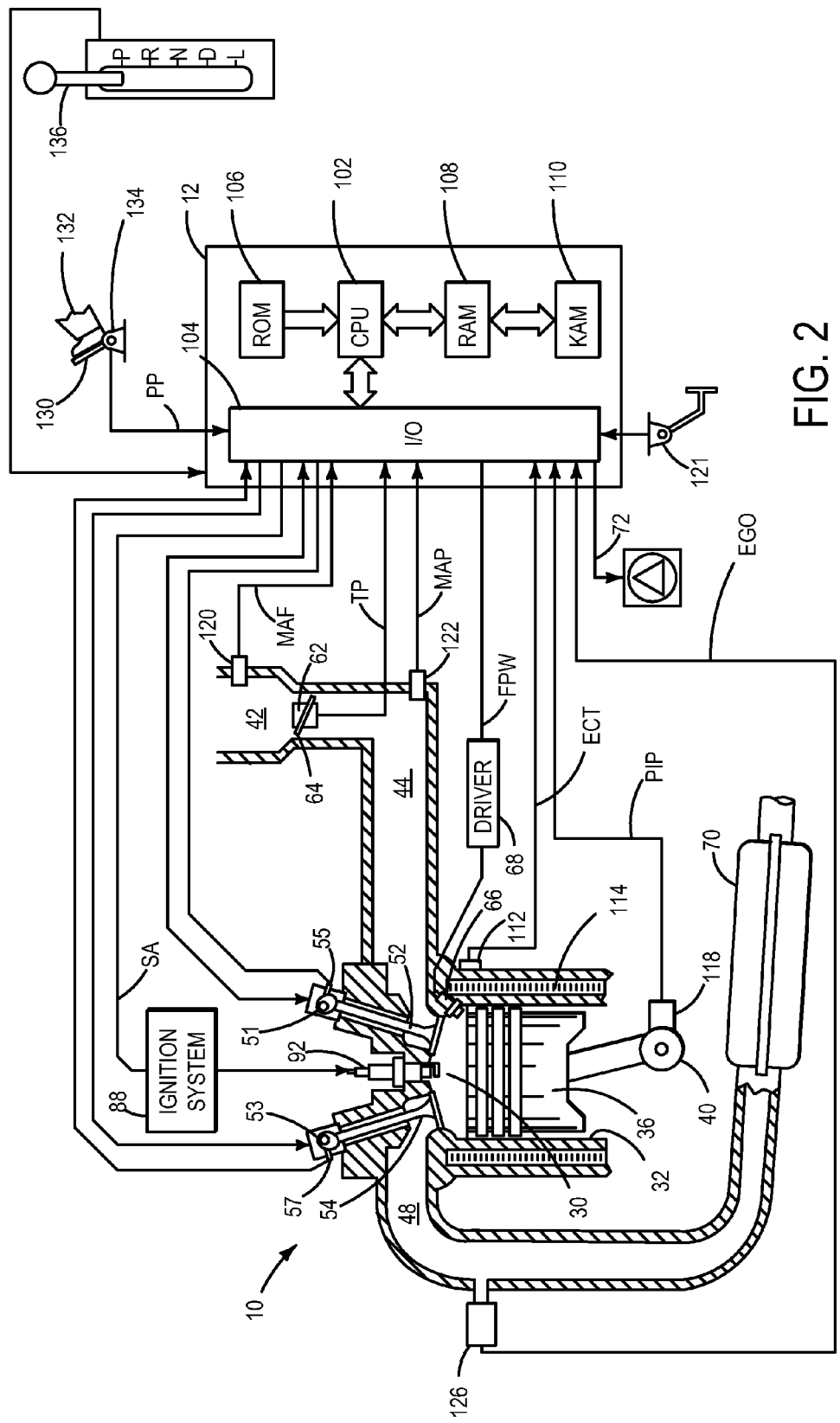
FIG. 2 shows schematic diagram of an engine.

Referring to FIG. 1, internal combustion engine 10, further described herein with particular reference to FIG. 2, is shown coupled to torque converter 11 via crankshaft 40. Torque converter 11 is also coupled to transmission 15 via turbine shaft 17. In one example, transmission 15 is a stepped-gear ratio transmission. Torque converter 11 has a bypass clutch (not shown) which can be engaged, disengaged, or partially engaged. When the clutch is either disengaged or being disengaged, the torque converter is said to be in an unlocked state. Turbine shaft 17 is also known as transmission input shaft. In one embodiment, transmission 15 comprises an electronically controlled transmission with a plurality of selectable discrete gear ratios. Transmission 15 may also comprises various other gears, such as, for example, a final drive ratio (not shown). Alternatively, transmission 15 may be a continuously variable transmission (CVT).

Transmission 15 may further be coupled to tire 19 via axle 21. Tire 19 interfaces the vehicle (not shown) to the road 23. Note that in one example embodiment, this power-train is coupled in a passenger vehicle that travels on the road. While various vehicle configurations may be used, in one example, the engine is the sole motive power source, and thus the vehicle is not a hybrid-electric, hybrid-plug-in, etc. In other embodiments, the method may be incorporated into a hybrid vehicle.

FIG. 2 is a schematic diagram showing one cylinder of multi-cylinder engine 10, which may be included in a propulsion system of an automobile. Engine 10 may be controlled at least partially by a control system including controller 12 and by input from a vehicle operator 132 via an input device. In one example, the input device includes an accelerator pedal 132 and a pedal position sensor 134 for generating a proportional pedal position signal PP. In another example, the input device includes a transmission lever 136 that may be shifted between different gear options by the driver based on a desired transmission output. In one preferred embodiment, the driver may have the following driver selectable options: park (P), reverse (R), neutral (N), driver (D), and low (L). In the depicted embodiment, the lever is known as a PRNDL lever, corresponding to the different options. In one example, when in park or neutral, substantially no torque may be transmitted from the engine to the transmission output. In drive, an electronic controller can control the transmission to select any available forward gear ratios. In reverse, a single reverse gear is selected. In low, only a lower set of forward gear ratios can be selected by the electronic controller. In some embodiments, there may be a low 1 and low 2 option. Transmission lever 136 may be located on a steering column or between driver and passenger seats.

Combustion chamber 30 of engine 10 may include cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves. Exhaust camshaft 53 operates exhaust valve 54 in accordance with the profile of a cam located along the length of the exhaust camshaft. Intake camshaft 51 operates intake valve 52 in accordance with the profile of a cam located along the length of the camshaft. Exhaust cam position sensor 57 and intake cam position sensor 55 relay respective camshaft positions to controller 12. Pump 72 supplies oil to index intake camshaft 51 and exhaust camshaft 53 relative to crankshaft 40 based on commands to camshaft actuators (not shown) supplied by controller 12. Pump 72 may be electrically driven so that camshafts may be indexed when engine 10 is not rotating.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 2 as a microcomputer, including microprocessor unit 102, input/output ports 104, an electronic storage medium for executable programs and calibration values shown as read-only memory 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; vehicle brake 121; a profile ignition pickup signal (PIP) from Hall effect sensor 118 (or other type) coupled to crankshaft 40; throttle position (TP) from a throttle position sensor; and absolute manifold pressure signal, MAP, from manifold pressure sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. In one example, sensor 118, which is also used as an engine speed sensor, may produce a predetermined number of equally spaced pulses every revolution of the crankshaft.

Storage medium read-only memory 106 can be programmed with computer readable data representing instructions executable by microprocessor unit 102 for performing the methods described below as well as other variants that are anticipated but not specifically listed.

Controller 12 also receives signals from and provides control signals to a transmission (not shown). Transmission signals may include but are not limited to transmission input and output speeds, signals for regulating transmission line pressure (e.g., fluid pressure supplied to transmission clutches), and signals for controlling pressure supplied to clutches for actuating transmission gears.

As described above, FIG. 2 shows only one cylinder of a multi-cylinder engine, and that each cylinder may similarly include its own set of intake/exhaust valves, fuel injector, spark plug, etc.

Figure 3:
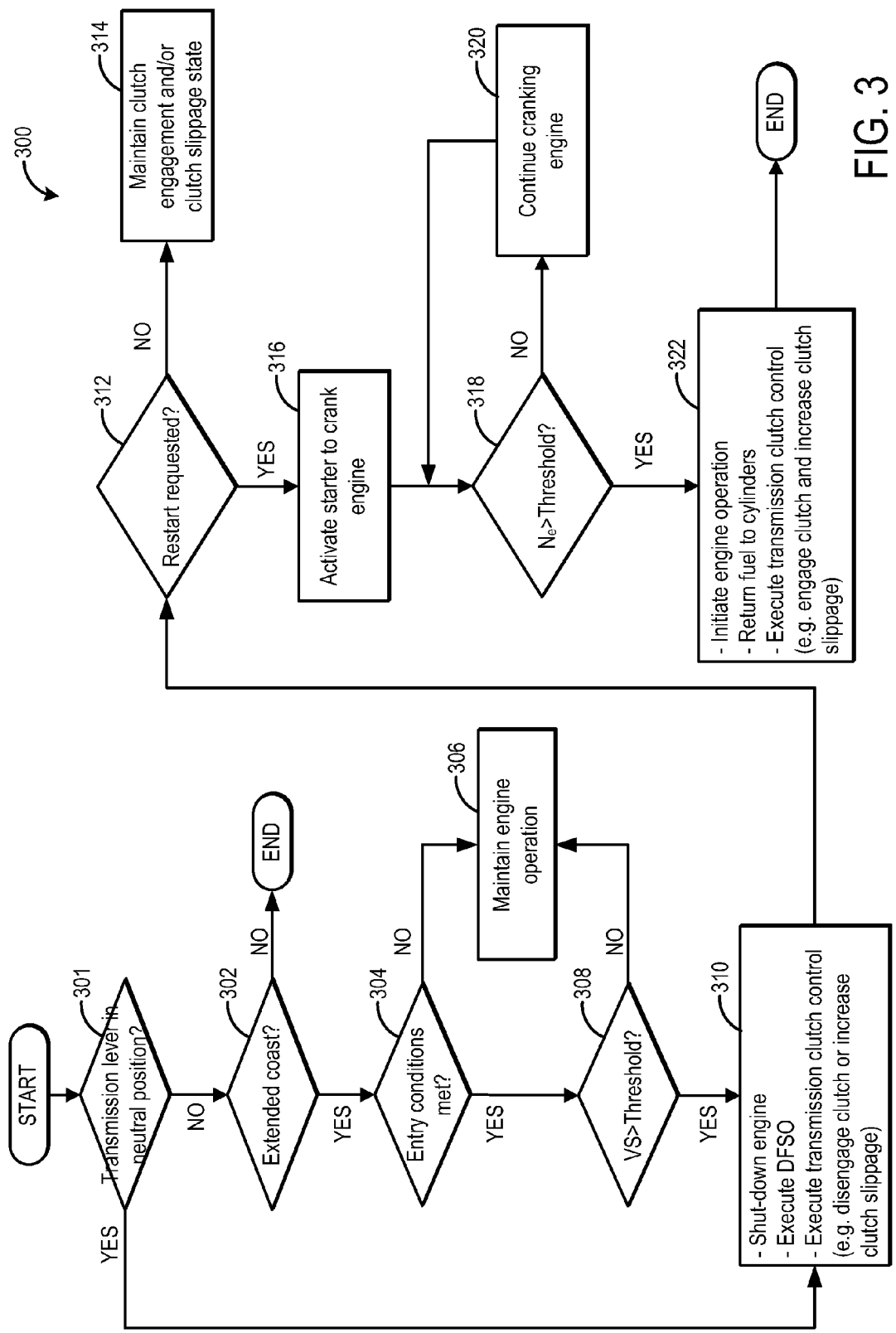
FIG. 3 shows a flow chart illustrating a control routine for an engine during coasting conditions.

Now turning to FIG. 3, a control routine 300 is illustrated for controlling an engine during vehicle coasting conditions. Specifically, routine 300 identifies opportunities while the vehicle is moving during which combustion in the engine may be deactivated by a driver. The routine further modulates one or more transmission clutches to enable a smooth transition during a subsequent engine restart, while the vehicle is still moving.

At 301, the routine may determine whether the vehicle operator has moved a transmission lever (such as PRNDL lever of FIG. 2) from a drive position (e.g., position D) to a neutral position (e.g., position N). In one example, a driver may shift the lever from a drive position to a neutral position to allow the vehicle to coast with the engine off. Thus, by shifting from drive to neutral, the operator may manually over-ride inferred engine shutdown commands, such as automatically inferred engine shutdown commands responsive to extended coasting conditions elaborated herein below. If the driver has shifted the lever to the neutral position, then in response to a vehicle moving condition wherein the vehicle is moving with a transmission lever in a neutral position, the routine may proceed to 310 wherein an electronic controller may stop the engine with the transmission engaged and with a first amount of transmission clutch slippage. In one example, as elaborated below, the engine may be stopped by shutting off a fuel supply to the engine. In an alternate embodiment, in response to the driver shifting the lever to the neutral position, the electronic controller may shutdown the engine with the transmission disengaged.

If the driver has not shifted the transmission to neutral, then at 302, extended coasting conditions may be confirmed. For example, vehicle coasting may be inferred when the brake and accelerator pedals are not pressed and the vehicle is moving. If extended coast conditions are not confirmed, the routine may end. Upon confirmation of vehicle coasting, at 304, entry conditions for a vehicle coast shut-down may be confirmed. Entry conditions may include, but are not limited to, engine purging conditions, a charge state of a vehicle battery, engine temperature, emission control device temperature, etc. For example, the battery may be employed to run various components (e.g., electric motors, lights, etc.) while the engine is off; thus, the engine may not be shutdown unless the battery attains a certain amount of charge. If entry conditions are not met, engine operation may be maintained at 306, that is, the engine may not be shutdown.

If entry conditions are met, then at 308, the vehicle speed may be estimated and it may be determined whether the vehicle speed (VS) is above a threshold value. In one example, the threshold speed may reflect a speed below which a vehicle coast shut-down operation may not substantially improve the vehicle's fuel economy. In another example, the threshold speed may correspond to an amount of vehicle inertia that may not be able to sustain vehicle coasting for a substantial duration, and wherein a potential vehicle stall may be imminent. Thus, if the vehicle speed is below the threshold, routine 300 may return to 306 to maintain engine operation and not shutdown the engine.

If vehicle speed is at or above the threshold, then at 310, the engine may be shutdown. In one example, a deceleration fuel shut-off (DFSO) operation may be executed to shut-off a fuel supply to the engine while the engine continues to rotate. Specifically, upon initiation of a DFSO operation, fuel injection is cut-off to the cylinders. The engine then continues to rotate, due to transmission of torque from the vehicle's wheel(s) to the engine through an engaged gear of the transmission, for example. Additionally at 310, a transmission clutch control operation may be executed to adjust the wheel torque applied on the engine. Specifically, during the transmission clutch control operation, one or more transmission clutches, including, for example, a torque converter lock-up clutch and/or a forward clutch, may be modulated to adjust a torque applied on the engine.

In one example, a torque converter lock-up clutch may be at least partially disengaged while the vehicle is moving to reduce the amount of wheel torque transmitted from the vehicle's moving wheels to the shutdown engine. An engine controller may keep the torque converter lock-up clutch partially disengaged (and thus, also partially engaged), and then controllably slip the clutch. For example, the clutch may be slipped by a first (smaller) amount, the amount of slippage adjusted based on, for example, engine speed and/or vehicle speed at the time of engine shutdown. In an alternate example, the torque converter lock-up clutch may be fully disengaged.

In this way, during a first vehicle moving condition, when the vehicle accelerator pedal and brake pedal are not being depressed, and the vehicle speed is above a threshold, the engine may be shutdown and the transmission may be at least partially disengaged while the vehicle is moving. In comparison, during a second vehicle moving condition, when the vehicle accelerator pedal and brake pedal are not being depressed, and with the vehicle speed being below the threshold, the engine may not be shutdown. By turning off the engine while the fuel injectors are shut-off and while the operator's foot is off the accelerator pedal and brake pedal, the amount of air pumped into the catalytic converter of the vehicle system's emission control device may be reduced. As such, this reduces the need for post fuel shut-off enrichment, thereby providing additional fuel economy benefits.

At 312, it may be determined whether a restart is requested. The engine restart may be initiated by a throttle or torque demand, by a change in vehicle speed, by a vehicle speed that is above or below a threshold, by a change in brake position, or by other restart conditions. Further, numerous embodiments are anticipated under which different conditions may be used to determine whether or not the engine is to be restarted. In one embodiment, an engine restart is initiated when the vehicle speed is below a first threshold, the threshold representative of a first vehicle inertia below which a coasting operation may not be sustained. In another embodiment, the brake position (e.g., the position of the vehicle brake pedal) and vehicle speed may be used to determine when to restart the engine. For example, if the operator's foot remains off the brake, an engine at rest may stay at rest until the vehicle comes to a stop and/or the operator presses his or her foot on the brake. Further, a change in position of the brake pedal (e.g., the brake pedal is repositioned) may be used to initiate an engine start. In another embodiment, an engine restart may be initiated based on a rate of change in vehicle speed. For example, if the operator's foot is off the brake and the vehicle is slowing because the road grade is changing (for example, when the vehicle is travelling on an uphill track), the engine may be restarted. Further, different signals and combinations of signals may be used to determine whether to restart the engine at 312.

If a restart is not requested, then at 314, the engine may remain shutdown and the partially disengaged state of the transmission may be maintained, for example, by maintaining the engagement state and/or clutch slippage of the transmission clutch. If restart conditions are confirmed, at 316, the engine may be started using starter motor assistance to initiate engine cranking.

In one example, the engine controller may be configured to communicate with a navigation device (for example, a global positioning system, GPS). The navigation device may be configured to detect upcoming stop signs and/or traffic lights. The navigation device may detect an upcoming vehicle stop based on various inputs, for example, from a vehicle camera, a vehicle smart cruise system, a vehicle to traffic signal communication system, a GPS with a map, etc. In one example, based on the indication (or prediction) of an upcoming vehicle stop, the routine may be configured to not restart the engine in response to the operator pressing the brake pedal and/or the vehicle speed dropping below a threshold. Additionally, the engine may be maintained in the shutdown condition for a threshold time following the operator pressing the brake pedal. That is, the routine may enable the vehicle to continue coasting to a complete stop and may extend the period of fuel injection shut-off. In another example, the navigation device may include a grade detection system configured to provide an estimate of the track grade. Herein, upon detecting the vehicle is coming to the bottom of a hill and will soon be going up a hill, the engine controller may restart the engine before the operator presses the accelerator pedal.

At 318, it may be determined whether the engine speed ($N_e$) is above a threshold, for example, above 1000 rpm. If the engine speed has not reached the threshold speed, the engine may continue to be cranked at 320 to raise the engine speed to the threshold value. Once the engine is rotating at or above the threshold speed, the routine proceeds to 322 wherein engine operation may be initiated, for example, by resuming fuel injection. Further, a transmission clutch control operation may be executed to adjust the amount of engine torque transferred to the moving vehicle wheels. Specifically, a degree of engagement of a transmission clutch may be adjusted to adjust a torque transmitted to the wheel. In one example, the engine may be started with the transmission engaged, by engaging a transmission forward clutch or a torque converter lock-up clutch, and then adjusting an amount of clutch slippage responsive to at least one of an engine speed (at the time of engine restart), a desired engine speed profile, and a driver demanded torque. In one example, the adjustment may include increasing an amount of clutch slippage when the engine speed is below a threshold, and decreasing an amount of clutch slippage when the engine speed is above the threshold. In another example, adjusting the amount of clutch slippage responsive to engine speed may include, increasing the amount of slippage as the engine speed increases, and then reducing the amount of slippage (for example, reducing to provide substantially no slippage) after the engine speed reaches the threshold.

In another example, during the vehicle coasting condition, the engine may be stopped with the transmission engaged (for example, by engaging the torque converter lock-up clutch) and with a first, lower, amount of transmission clutch slippage. Then, during a subsequent restart, the engine may be started, while the vehicle is still moving, with the transmission still engaged and with a second, larger, amount of transmission clutch slippage.

In still another example, during the engine shutdown, the transmission may be fully disengaged. Then, during a subsequent restart, the engine may be started with the transmission still disengaged, for example, with the transmission in a neutral gear. The transmission may then be engaged after the engine speed has reached a threshold speed. The threshold engine speed may be determined as a function of the desired transmission gear, which in turn, may be determined as a function of the accelerator pedal position input and the vehicle speed. In yet another example, the clutch capacity of the transmission clutches may be controlled to transmit only the desired amount of torque and to spin (due to clutch slippage) at torques above that. For example, the clutch torque capacity may be adjusted by changing the duty cycle of the clutch pressure controlling variable force solenoids. Herein, in addition to controlling the torque transmitted by the transmission, the clutches may be kept in a pre-stroked condition, thereby reducing delays in clutch engagement.

Figure 4:
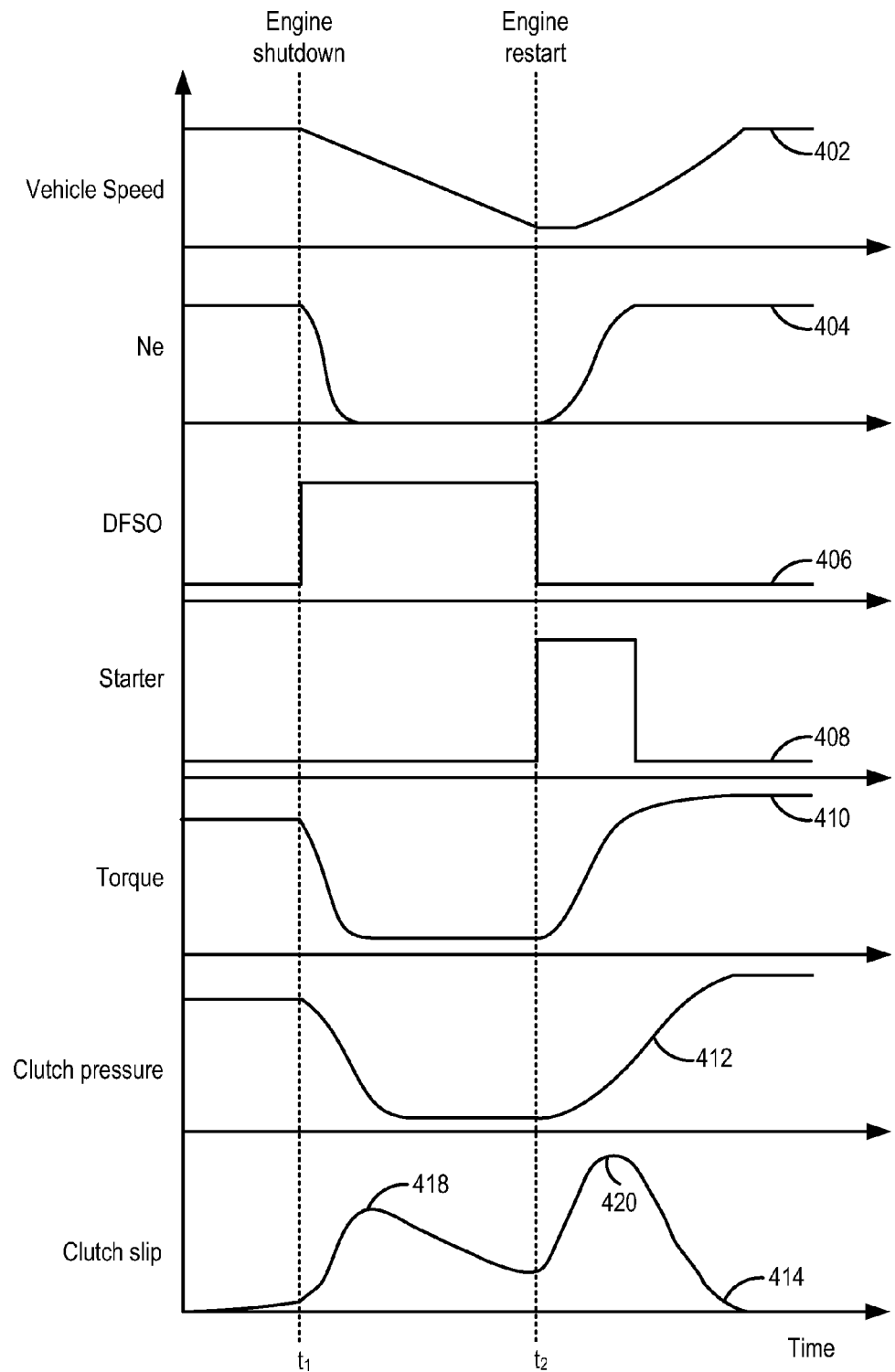
FIG. 4 shows a map graphically illustrating example engine shut-down and restart operations during vehicle coasting, according to the present disclosure.

Example transmission clutch adjustments are further explained herein with reference to FIG. 4.

Other engine operating conditions may also be adjusted to enable a smooth restart. For example, fuel timing, position of cams, spark timing (advance/retard), fuel injection location of start of injection, fuel injection amount, fuel injection pressure, and throttle position may be adjusted to improve the engine start. In one example, fuel may be directly injected to a cylinder before engine rotation so as to assist in engine rotation when a spark is output to combust the injected fuel. In another example, the fuel timing may additionally be advanced or retarded relative to a crankshaft angle at which fuel was delivered to the engine prior to last engine stop. In still another example, a throttle angle may be set so that a controlled amount of air enters the cylinder during the engine restart. Further, combinations or sub-combinations of these and other parameters may be adjusted during the engine start.

The engine control parameters may also be set in relation to the vehicle speed during the engine restart during vehicle moving conditions. For example, cam timing, throttle position, fuel start of injection, fuel timing, and spark angle may be adjusted such that the amount of torque generated by the engine at restart of the moving vehicle is at or slightly below the torque required to keep the vehicle moving at the present vehicle speed. In another example, the engine may be restarted by setting the engine control parameters to a first position at engine restart, and then shortly after start or during engine run-up, the parameters may be set to a second position that is based on the vehicle speed. In this way, the operation of the engine can be adjusted in relation to the vehicle's speed so that smooth transitions between operating the vehicle without the engine and operating the vehicle with the engine can occur.

Now turning to FIG. 4, map 400 depicts example engine shutdown and restart scenarios with a plurality of graphs 402-414. Graph 402 depicts changes in vehicle speed during the example vehicle coast engine shutdown and/or restart operations. Graph 404 depicts changes in engine speed over the same duration. Graph 406 provides an indication of the status (0 or 1) of a DFSO operation. Graph 408 provides an indication of the absence or presence (0 or 1) of a starter motor assistance. Graph 410 depicts changes in torque output. Graph 412 depicts adjustments to a transmission engagement state, as indicated by corresponding changes in a transmission clutch pressure. Graph 414 further depicts changes in an amount of clutch slippage for the transmission clutch of graph 412.

At $t_1$, a first vehicle moving condition, specifically a vehicle coasting condition, may be confirmed. Herein, the vehicle operator may have removed his foot from the vehicle accelerator pedal and may not have pressed the brake pedal. Further, at the time of driver foot-off from the accelerator and brake pedals, the vehicle speed may be a higher amount, for example, the vehicle speed may be above a threshold. As such, due to the accelerator pedal and brake pedals not being depressed, the vehicle speed may slowly decrease (depicted in graph 402) as the vehicle coasts towards a potential vehicle stop. In response to the first vehicle moving condition, at $t_1$, an engine controller may be configured to shutdown the engine, for example, by performing a DFSO operation (graph 406) wherein a fuel injection to the engine cylinders is shut off to stop combustion therein. In response to the engine shutdown, the engine speed may start to drop (graph 404).

Further, to aid engine spin-down, the wheel torque of the moving wheels may be decoupled from the engine by at least partially disengaging the transmission. In one example, this may be achieved by at least partially disengaging a transmission clutch. In one example, the transmission clutch may be a torque converter lock-up clutch and the clutch may be disengaged (for example, partially disengaged or completely disengaged) by reducing the clutch pressure, as indicated in graph 412. In an alternate example, the transmission clutch may be a forward clutch. In one example, in addition to reducing the engagement of the transmission clutch, the clutch may be slipped, for example by a first amount 418 of clutch slippage (graph 414). The transmission clutch may then be maintained in the reduced engagement state with the first amount of clutch slippage until a subsequent engine restart is requested.

At $t_2$, a second vehicle moving condition, specifically an engine restart while the vehicle is moving condition, may be confirmed. For example, the engine may be restarted in response to the vehicle operator applying his foot on the vehicle accelerator pedal (or brake pedal). In another example, the engine may be restarted in response to the vehicle speed being a lower amount, for example, below a threshold. In response to the second vehicle moving condition, at $t_2$, the engine controller may be configured to restart the engine, for example, by stopping the DFSO operation (graph 406) and resuming fuel injection to the engine cylinders to start combustion therein. Additionally, the engine controller may start cranking the engine with starter motor assistance (graph 408). In response to the engine restart, the engine speed may start to rise (graph 404).

Further, to enable the driver demanded torque to be provided, and reduce a torque surge due to the addition of the engine torque to the wheel torque, the engine may be restarted while the vehicle is moving with the transmission still engaged and with the transmission clutch providing a second, larger, amount 420 of clutch slippage (graph 414). Herein, the transmission clutch may be controlled, for example using slip control, to provide only the desired amount of torque, and to spin at torques above that. The transmission clutch may continue to be maintained in the engaged state with the clutch slipping until the engine speed reaches a threshold. The controller may be configured to reduce the clutch slippage, for example, reduce clutch slippage to provide substantially no clutch slippage, when the engine reaches the threshold.

In this way, while the vehicle is moving, an engine shutdown may be performed and an engine spin-down may be assisted by reducing the effects of wheel torque from the moving wheels on the engine. Further, by slipping the transmission clutch and adjusting the amount of clutch slippage during a subsequent restart, when the vehicle is still moving, the amount of engine torque transferred from the rotating engine to the moving wheels may be limited during the start. Then, when a higher wheel torque is desired to keep propelling the vehicle, the amount of slippage may be reduced to transmit the engine torque to the wheels. By limiting the amount of engine torque transferred during the start, torque surge and vehicle lurch may be reduced, and a smooth transition between combusting and non-combusting engine modes, while the vehicle is moving, may be achieved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling a vehicle engine, the engine being coupled to a transmission, comprising:
in response to a first vehicle moving condition, spinning the engine down to rest with the transmission engaged and with a first amount of transmission clutch slippage; and
during a subsequent restart, starting the engine from rest while the vehicle is moving with the transmission engaged, and with a second, larger amount of transmission clutch slippage.

2. The method of claim 1, wherein the first vehicle moving condition includes the vehicle moving with an accelerator pedal not depressed and a brake pedal not depressed, and a vehicle speed being above a threshold.

3. The method of claim 2, further comprising, in response to a second vehicle moving condition, wherein the vehicle is moving with the accelerator pedal not depressed and the brake pedal not depressed, and the vehicle speed is below the threshold, not spinning the engine down to rest.

4. The method of claim 1, wherein starting the engine includes starting the engine with starter motor assistance.

5. The method of claim 1, wherein the transmission is a stepped-gear-ratio transmission and wherein the transmission clutch is one of a torque converter lock-up clutch and a forward clutch.

6. The method of claim 1, wherein the second, larger amount of transmission clutch slippage is adjusted based on at least one of an engine speed, a desired engine speed profile and a driver demanded torque.

7. The method of claim 6, wherein adjusting the second amount of transmission clutch slippage based on engine speed includes, increasing the second amount of transmission clutch slippage as the engine speed increases, the method further comprising reducing the second amount of transmission clutch slippage after the engine speed reaches a threshold.

8. A vehicle system, comprising
an engine;
a transmission including a transmission clutch; and
a control system configured to,
in response to a first vehicle moving condition, spin the engine down to rest with the transmission engaged and with a first amount of transmission clutch slippage;
during a subsequent restart following the first vehicle moving condition, start the engine from rest while the vehicle is traveling with the transmission engaged, and with a second, larger amount of transmission clutch slippage; and
in response to a second vehicle moving condition, not spin the engine down to rest.

9. The vehicle system of claim 8, wherein the control system is further configured to move the vehicle with an accelerator pedal not depressed and a brake pedal not depressed and with a vehicle speed above a threshold during the first moving condition, and to move the vehicle with the accelerator pedal not depressed and the brake pedal not depressed and with the vehicle speed below the threshold during the second moving condition.

10. The vehicle system of claim 9, wherein the control system is further configured to adjust the second, larger amount of transmission clutch slippage responsive to engine speed, the adjustment including an increase in an amount of slippage as engine speed increases, and a reduction in the amount of slippage when the engine speed is above an engine speed threshold.

11. The vehicle system of claim 8, wherein the control system is further configured to shut off a fuel supply to the engine when stopping the engine.

12. The vehicle system of claim 8, further comprising a starter motor, wherein the control system is further configured to apply starter motor assistance when starting the engine.

13. A method for controlling a vehicle engine, the engine being coupled to a transmission, comprising:
in response to the vehicle moving with a transmission lever in a neutral position, stopping the engine with the transmission engaged and with a first amount of transmission clutch slippage; and
during a subsequent restart, starting the engine while the vehicle is moving with the transmission engaged, and with a second, larger amount of transmission clutch slippage.

* * * * *